US011240551B2

United States Patent
Cremer

(10) Patent No.: US 11,240,551 B2
(45) Date of Patent: *Feb. 1, 2022

(54) MUSIC SERVICE WITH MOTION VIDEO

(71) Applicant: Gracenote, Inc., Emeryville, CA (US)

(72) Inventor: Markus K. Cremer, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/137,986

(22) Filed: Dec. 30, 2020

(65) Prior Publication Data

US 2021/0120304 A1 Apr. 22, 2021

Related U.S. Application Data

(63) Continuation of application No. 16/576,612, filed on Sep. 19, 2019, now Pat. No. 10,897,644, which is a
(Continued)

(51) Int. Cl.
*H04N 21/439* (2011.01)
*H04N 21/43* (2011.01)
*H04N 21/45* (2011.01)

(52) U.S. Cl.
CPC ..... *H04N 21/4307* (2013.01); *H04N 21/4394* (2013.01); *H04N 21/4532* (2013.01)

(58) Field of Classification Search
None
See application file for complete search history.

(56) References Cited

U.S. PATENT DOCUMENTS 10,462,512 B2 * 10/2019 Cremer .............. H04N 21/4307
10,897,644 B2 * 1/2021 Cremer .............. H04N 21/4307
(Continued)

FOREIGN PATENT DOCUMENTS

| CN | 104584571 A | 4/2015 |
| CN | 106462609 A | 2/2017 |

(Continued)

OTHER PUBLICATIONS

Chuang, Y., et al., Use Second Screen to Enhance TV Viewing Experiences, Jan. 1, 2013, 12th European Conference on Computer Vision, ECCV 2012; Lecture Notes in Computer Science, pp. 366-374.

(Continued)

*Primary Examiner* — Eileen M Adams
(74) *Attorney, Agent, or Firm* — McDonnell Boehnen Hulbert & Berghoff LLP

(57) ABSTRACT

Techniques of providing motion video content along with audio content are disclosed. In some example embodiments, a computer-implemented system is configured to perform operations comprising: receiving primary audio content; determining that at least one reference audio content satisfies a predetermined similarity threshold based on a comparison of the primary audio content with the at least one reference audio content; for each one of the at least one reference audio content, identifying motion video content based on the motion video content being stored in association with the one of the at least one reference audio content and not stored in association with the primary audio content; and causing the identified motion video content to be displayed on a device concurrently with a presentation of the primary audio content on the device.

20 Claims, 10 Drawing Sheets

Related U.S. Application Data continuation of application No. 15/475,488, filed on Mar. 31, 2017, now Pat. No. 10,462,512.

(56) References Cited

U.S. PATENT DOCUMENTS

| | | | |
|---|---|---|---|
| 2013/0044260 | A1 | 2/2013 | Vestergaard et al. |
| 2013/0057761 | A1 | 3/2013 | Bloom et al. |
| 2014/0028914 | A1 | 1/2014 | Polak et al. |
| 2015/0086174 | A1* | 3/2015 | Abecassis .......... H04N 21/4307 386/201 |
| 2015/0373231 | A1 | 12/2015 | Biswas et al. |
| 2016/0066064 | A1* | 3/2016 | Chesluk .......... H04N 21/25891 725/93 |
| 2016/0165227 | A1 | 6/2016 | Babbar et al. |
| 2016/0188981 | A1* | 6/2016 | Doerring ............. G06F 16/7834 382/190 |
| 2016/0277808 | A1 | 9/2016 | Yu et al. |

FOREIGN PATENT DOCUMENTS

| | | |
|---|---|---|
| EP | 3142118 A1 | 3/2017 |
| JP | 2005506643 A | 3/2005 |
| JP | 2013131871 A | 7/2013 |
| JP | 2015025984 A | 2/2015 |
| JP | 2017038152 A | 2/2017 |
| KR | 10-2004-0040409 A | 5/2004 |
| KR | 10-2005-0099488 A | 10/2005 |
| KR | 10-2006-0037403 A | 5/2006 |
| KR | 10-2011-0045026 A | 5/2011 |
| KR | 10-2012-0026090 A | 3/2012 |
| KR | 10-2013-0055748 A | 5/2013 |
| KR | 10-2014-0036281 A | 3/2014 |
| KR | 10-2015-0027279 A | 3/2015 |

OTHER PUBLICATIONS

Muller, J., et al., "Next-Generation Hybrid Broadcast Broadband Deliverable D4.1," Apr. 12, 2012, Retrieved from the Internet: URL:http://www.hbb-next.eu/documents/HBB-NEXT_D4.1.pdf, retrieved on Jul. 9, 2012.

Kennedy, L., et al., "Less talk, more rock," International World Wide Web Conference 18th, ACM, Madrid, ES, Apr. 20, 2009, pp. 311-320.

Bryan, N. J., et al., "Clustering and synchronizing multi-camera video via landmark cross-correlation," 2012 IEEE International Conference on Acoustics, Speech and Signal Processing (ICASSP 2012): Kyoto, Japan, Mar. 25-30, 2012; Proceedings IEEE, Piscataway, NJ, Mar. 25, 2012, pp. 2389-2392.

Bano, S., et al., "Discovery and organization of multi-camera user-generated videos of the same event," Information Sciences, vol. 302, May 1, 2015, pp. 108-121.

Tsai, T. J., et al., "Robust and efficient multiple alignment of unsynchronized meeting recordings," IEEE/ACM Transactions on Audio, Speech, and Language Processing, IEEE, USA, Vo. 24, No. 5, May 1, 2016, pp. 833-845.

Written Opinion of the International Searching Authority dated Jul. 20, 2018 issued in connection with International Application No. PCT/US2018/025392, filed Mar. 30, 2018, 6 pages.

International Search Report dated Jul. 20, 2018 issued in connection with International Application No. PCT/US2018/025392, filed Mar. 30, 2018, 3 pages.

European Search Report dated Sep. 22, 2020 issued in connection with European Patent Application No. 18778336.0, filed Mar. 30, 2018, 8 pages.

Communication pursuant to Article 94(3) EPC dated Jul. 15, 2021 issued in connection with European Patent Application No. 18778336.0, filed Mar. 30, 2018, 6 pages.

\* cited by examiner

MUSIC SERVICE WITH MOTION VIDEO

REFERENCE TO RELATED APPLICATION

This disclosure is a continuation of U.S. patent application Ser. No. 16/576,612, filed Sep. 19, 2019. The Ser. No. 16/576,612 application is a continuation of U.S. patent application Ser. No. 15/475,488, filed Mar. 31, 2017. The entirety of the Ser. Nos. 16/576,612 and 15/475,488 applications are hereby incorporated by reference.

TECHNICAL FIELD

The present application relates generally to the technical field of data processing, and, in various embodiments, to methods and systems of providing motion video content along with audio content.

BACKGROUND

The presentation of audio content often lacks corresponding motion video content. Combining the presentation of motion video content with the presentation such audio content presents many technical challenges, including, but not limited to, determining what motion video content to use and how to combine the motion video content with the audio content.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
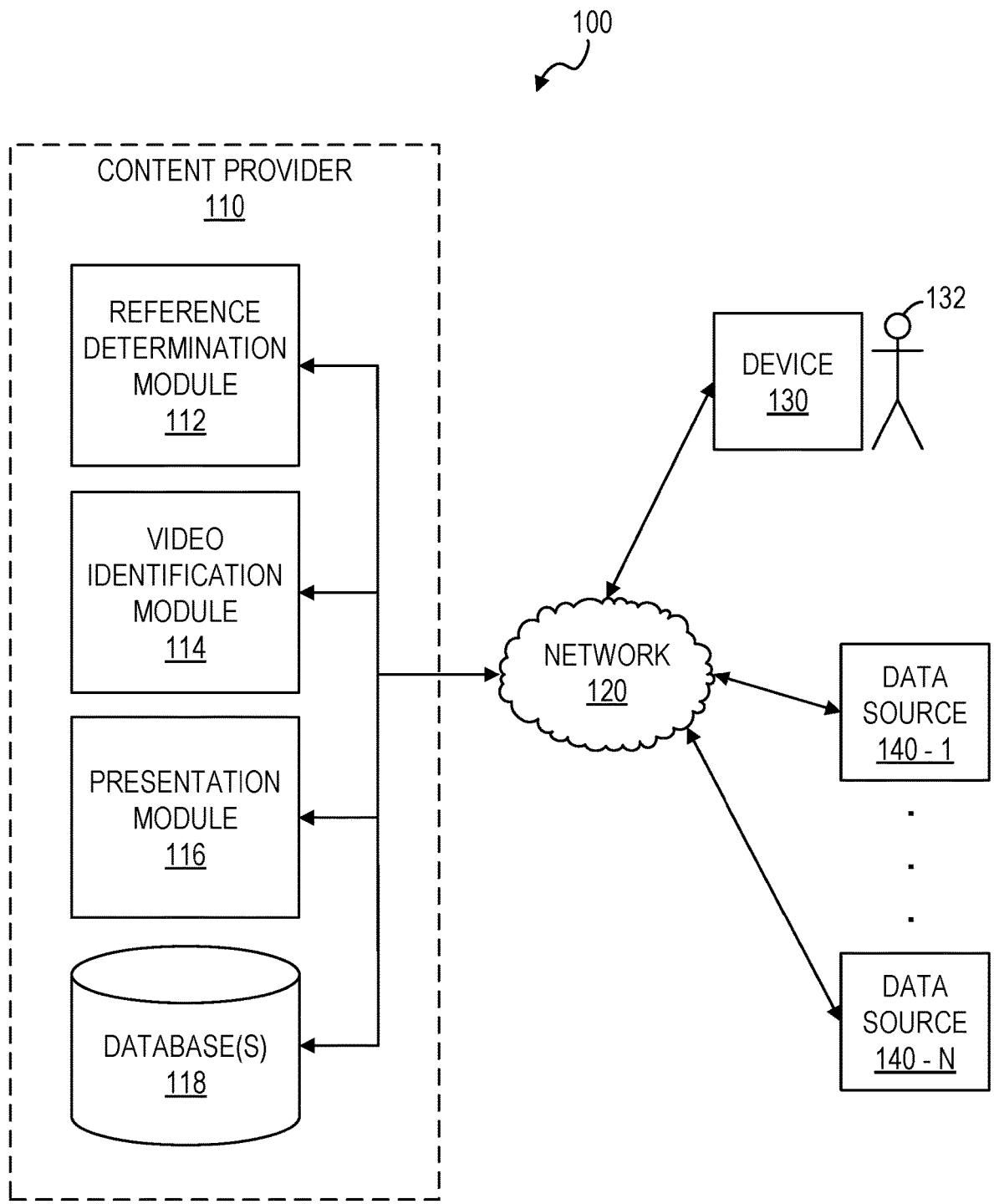
FIG. 1 is a block diagram illustrating a network environment suitable for providing motion video content along with audio content, in accordance with some example embodiments.

Example methods and systems of providing motion video content along with audio content are disclosed. In the following description, for purposes of explanation, numerous specific details are set forth in order to provide a thorough understanding of example embodiments. It will be evident, however, to one skilled in the art that the present embodiments may be practiced without these specific details.

In some example embodiments, a computer-implemented implemented method comprises: receiving primary audio content; determining that at least one reference audio content satisfies a predetermined similarity threshold based on a comparison of the primary audio content with the at least one reference audio content; for each one of the at least one reference audio content, identifying motion video content based on the motion video content being stored in association with the one of the at least one reference audio content and not stored in association with the primary audio content; and causing the identified motion video content to be displayed on a device concurrently with a presentation of the primary audio content on the device. In some example embodiments, the primary audio content comprises music.

In some example embodiments, the comparison comprises a comparison of fingerprint data of the primary audio content with fingerprint data of the at least one reference audio content.

In some example embodiments, the identifying of the motion video content is further based on a profile of a user associated with the device.

In some example embodiments, the causing the identified motion video content to be displayed on the device concurrently with the presentation of the primary audio content on the device comprises: synchronizing data of the at least one reference audio content with data of the primary audio content; and synchronizing the identified motion video content with the primary audio content based on the synchronizing of the data of the at least one reference audio content with the data of the primary audio content. In some example embodiments, the synchronizing of the data of the at least one reference audio content with the data of the primary audio content is based on a comparison of fingerprint data of the at least one reference audio content with fingerprint data of the primary audio content.

In some example embodiments, the at least one reference audio content comprises at least two reference audio content, each one of the at least two reference audio content being stored in association with different motion video content, the identified motion video content comprising a portion of each of the different motion video content.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

FIG. 1 is a block diagram illustrating a network environment 100 suitable for providing motion video content along with audio content, in accordance with some example embodiments. The network environment 100 includes a content provider 110, one or more devices 130, and one or more data sources 140 (e.g., data source 140-1 through data source 140-N), all of which are communicatively coupled to each other via a network 120. The content provider 110, the device(s) 130, and the data source(s) 140 may each be implemented in a computer system, in whole or in part, as described below with respect to FIG. 8.

Also shown in FIG. 1 is a user 132. The user 132 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132.

Any of the machines, providers, modules, databases, devices, or data sources shown in FIG. 1 may be implemented in a computer modified (e.g., configured or programmed) by software to be a special-purpose computer to perform one or more of the functions described herein for that machine, provider, module, database, device, or data source. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the databases, devices, or data sources illustrated in FIG. 1 may be combined into a single machine, and the functions described herein for any single database, device, or data source may be subdivided among multiple databases, devices, or data sources.

The network 120 may be any network that enables communication between or among machines, databases, and devices. Accordingly, the network 120 may be a wired network, a wireless network (e.g., a mobile or cellular network), or any suitable combination thereof. The network 120 may include one or more portions that constitute a private network, a public network (e.g., the Internet), or any suitable combination thereof. Accordingly, the network 120 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

The content provider 110 comprises a computer system configured to provide audio content and video content to devices, such as device 130. In some example embodiments, the content provider 110 comprises any combination of one or more of a reference determination module 112, a video identification module 114, a presentation module 116, and one or more databases 118. In some example embodiments, the modules 112, 114, and 116, and the database(s) 118 reside on a machine having a memory and at least one processor. In some example embodiments, the modules 112, 114, and 116, and the database(s) 118 reside on the same machine, while in other example embodiments, one or more of modules 112, 114, and 116 and database(s) 118 reside on separate remote machines that communicate with each other via a network, such as network 120.

In some example embodiments, the reference determination module 112 is configured to receive primary audio content. The audio content may comprise music, such as a single song recording. However, it is contemplated that other types of audio content are also within the scope of the present disclosure. In some example embodiments, the reference determination module 112 is configured to identify, or otherwise determine, at least one reference audio content that satisfies a predetermined similarity threshold based on a comparison of the primary audio content with the reference audio content. For example, the reference determination module 112 may search a plurality of reference audio content stored on database(s) 118 for reference audio content that satisfies the predetermined similarity threshold. Additionally, or alternatively, the reference determination module 112 may search one or more external data sources 140 for reference audio content that satisfies the predetermined similarity threshold. The external data sources 140 may comprise data sources that are separate and independent from the content provider 110.

Figure 2:
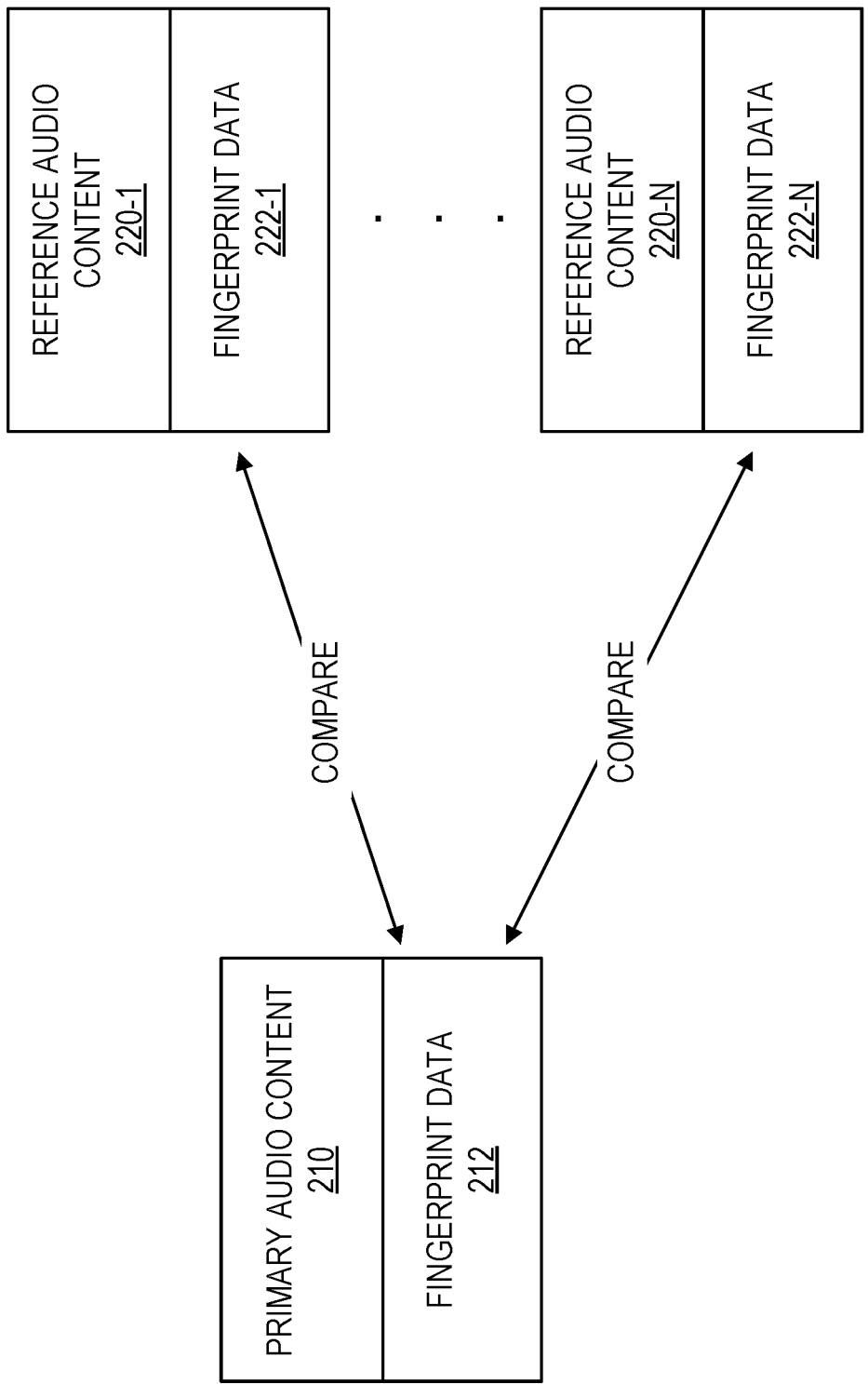
FIG. 2 illustrates a comparison of primary audio content with a plurality of reference audio content, in accordance with some example embodiments.

In some example embodiments, the comparison of the primary audio content with the reference audio content comprises a comparison of data of the primary audio content with data of the reference audio content. The data being compared may comprise fingerprint data that uniquely identifies or characterizes the corresponding audio content. FIG. 2 illustrates a comparison of primary audio content with a plurality of reference audio content, in accordance with some example embodiments. In FIG. 2, fingerprint data 212 of primary audio content 210 is compared with a plurality of fingerprint data 222 (e.g., fingerprint data 222-1, . . . , fingerprint data 222-N) of a plurality of reference audio content 220 (e.g., reference audio content 220-1, . . . , reference audio content 220-N). In some example embodiments, each comparison generates corresponding statistical data that indicates a level of similarity between the primary audio content and the reference audio content. One example of such statistical data is a bit error rate. However, it is contemplated that other statistical data is also within the scope of the present disclosure. In some example embodiments, the reference determination module 112 determines if the statistical data corresponding to a reference audio content 220 satisfies a predetermined threshold.

In some example embodiments, the reference determination module 112 is configured to use an exact fingerprint match between the fingerprint data 212 of the primary audio content 210 and the fingerprint data 222 of the reference audio content 220 as the predetermined threshold. For example, the reference determination module 112 may search through the plurality of reference audio content 220 to match one version of an audio recording (e.g., compressed or noisy) to a version of the same audio recording that is not degraded.

In some example embodiments, the reference determination module 112 is configured to use a fuzzy fingerprint match between the fingerprint data 212 of the primary audio content 210 and the fingerprint data 222 of the reference audio content 220 as the predetermined threshold. For example, the reference determination module 112 may search through the plurality of reference audio content 220 and match a recording of a song (or a theatrical performance, narration, or the like) to a different performance or recording of the same song (or theatrical performance, narration, or the like).

In some example embodiments, the reference determination module 112 is configured to use a match between audio characteristics, such as chords, rhythmic features, instrument onsets, and the like, of the primary audio content 210 and such audio characteristics of the reference audio content

220 as the predetermined threshold. For example, the reference determination module 112 may search through the plurality of reference audio content 220 and match one audio recording with another audio recording simply based on particular level of similarity between the audio characteristics of the different audio recordings, such as matching two different songs based on a determination of a high level of similarity between the rhythmic features of the two different songs.

In some example embodiments, for one or more of the reference audio content 220 that is determined to satisfy the similarity threshold, the video identification module 114 identifies motion video content based on the motion video content being stored in association with the reference audio content and not stored in association with the primary audio content. In some example embodiments, the video identification module 114 is configured to identify the motion video content also based on a profile of a user 132 associated with the device 130 to which the combination of the primary audio content and the identified motion video content will be presented. In some example embodiments, user profiles are stored in database(s) 118. The profile of the user 132 may comprise any combination of one or more of a history of audio content listened to by the user 132, indications that the user 132 likes certain types or categories of audio content, purchase history of audio content, a history of motion video content viewed by the user 132, indications that the user 132 likes certain types or categories of motion video, and demographic information about the user 132 (e.g., gender, age, geographic location). Other types of information indicating potential preferences for certain types of audio content or certain types of video content may also be included in the profile of the user 132. In scenarios where several different motion video contents satisfy the similarity threshold, the video identification module 114 may use the profile of the user 132 to select one or more motion video contents based on a determination of what motion video content is most relevant to the user 132.

In some example embodiments, the presentation module 116 is configured to cause the motion video content identified by the video identification module 114 to be displayed on the device 130 concurrently with a presentation of the primary audio content on the device 132. In some example embodiments where the primary audio content comprises a song, the content provider 110 has thus dynamically created a music video for a song for which the content provider 110 was storing a music video.

In some example embodiments, the presentation module 116 is configured to synchronize data of the reference audio content with data of the primary audio content, and then synchronize the identified motion video content with the primary audio content based on the synchronizing of the data of the reference audio content with the data of the primary audio content. In some example embodiments, the synchronizing of the data of the reference audio content with the data of the primary audio content is based on a comparison of fingerprint data of the reference audio content with fingerprint data of the primary audio content.

Figure 3A:
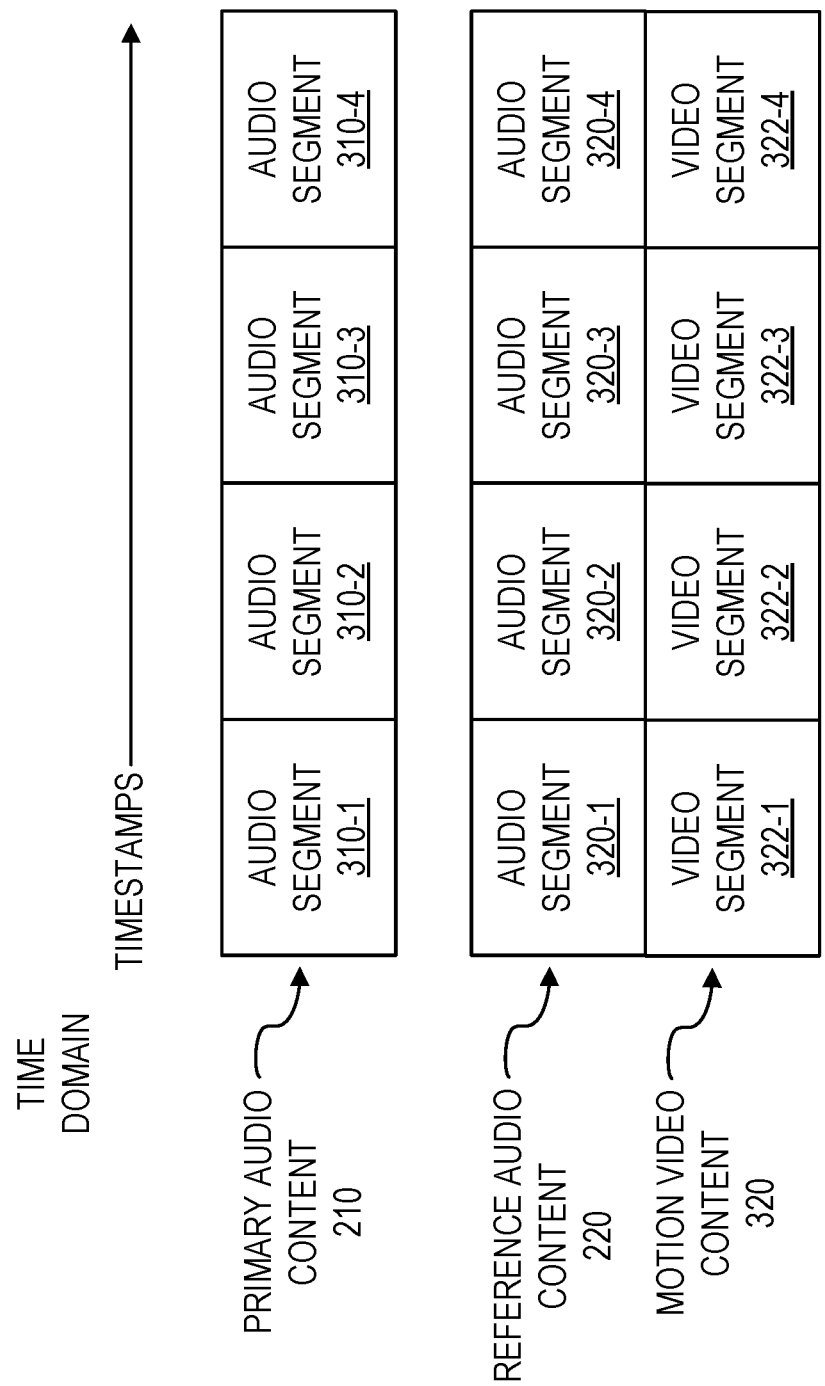
FIGS. 3A-3B are conceptual diagrams illustrating the synchronizing of motion video content with primary audio content, in accordance with some example embodiments.
Figure 3B:
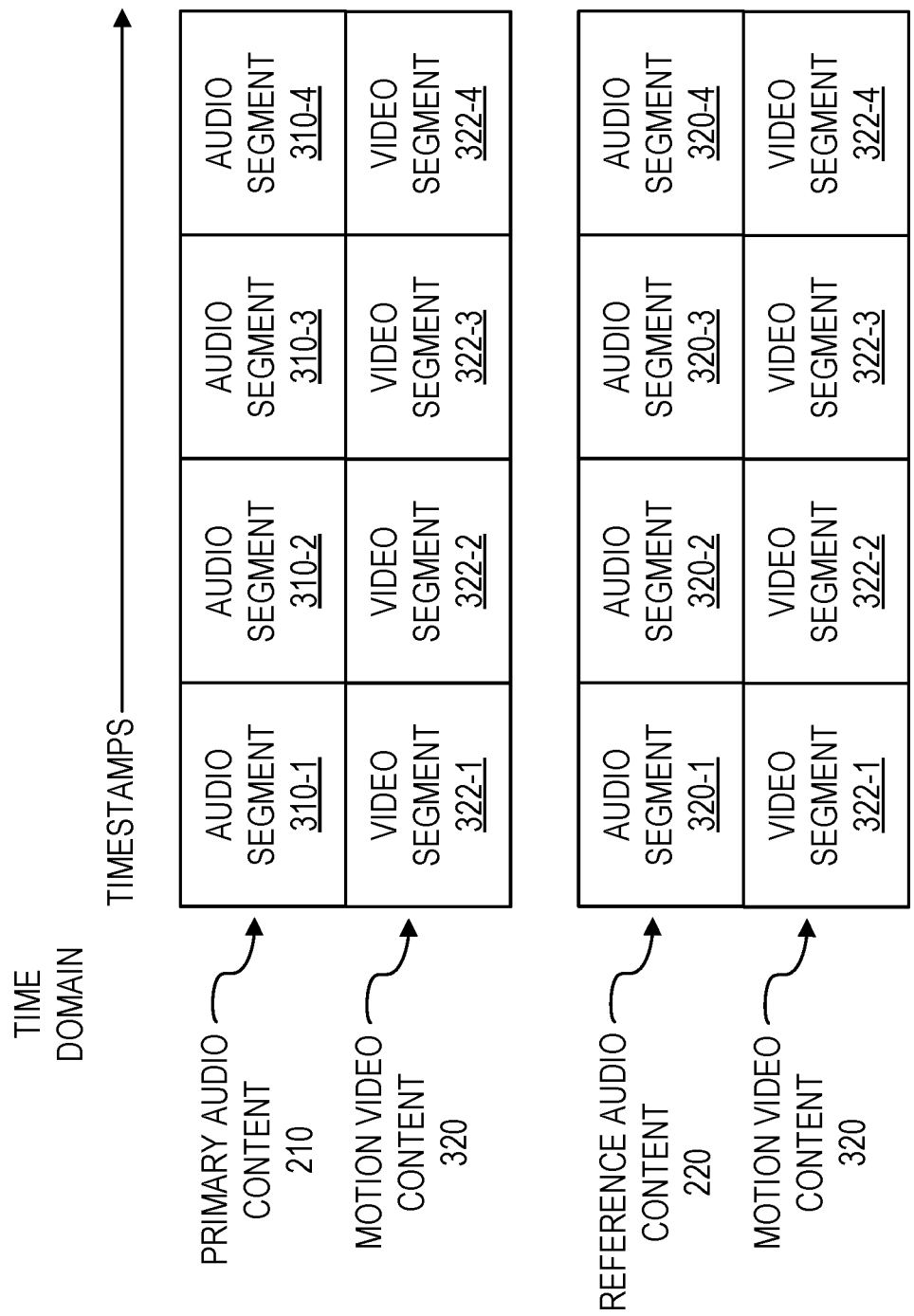

FIGS. 3A-3B are conceptual diagrams illustrating the synchronizing of motion video content with primary audio content, in accordance with some example embodiments. In FIG. 3A, a primary audio content 210 is shown as being made up of audio segments 310-1, 310-2, 310-3, and 310-4, and reference audio content 220 is shown as being made up of audio segments 320-1, 320-2, 320-3, and 320-4. Reference audio content 220 is also shown as being stored in association with motion video content 320, which is shown as being made up of video segments 322-1, 322-2, 322-3, and 322-4. It is contemplated that other segmentation configurations are also within the scope of the present disclosure. In FIG. 3A, the audio segments 310 of the primary audio content 210 and the audio segments 320 of the reference audio content 220 are aligned along a time domain in accordance with their respective timestamps as a result of the presentation module 116 synchronizing them. Similarly, the video segments 322 of the motion video content 320 are aligned with the audio segments 320 of the reference audio content 220 with which it is associated.

In FIG. 3B, using the synchronization of the audio segments of the 320 of the reference audio content 220 with the audio segments 310 of the primary audio content 210, as well as the synchronization of the video segments 322 of the motion video content 320 with the audio segments 320 of the reference audio content 220, the presentation module 116 synchronizes the video segments 322 of the motion video content 320 with the audio segments 310 of the primary audio content 210.

Figure 4A:
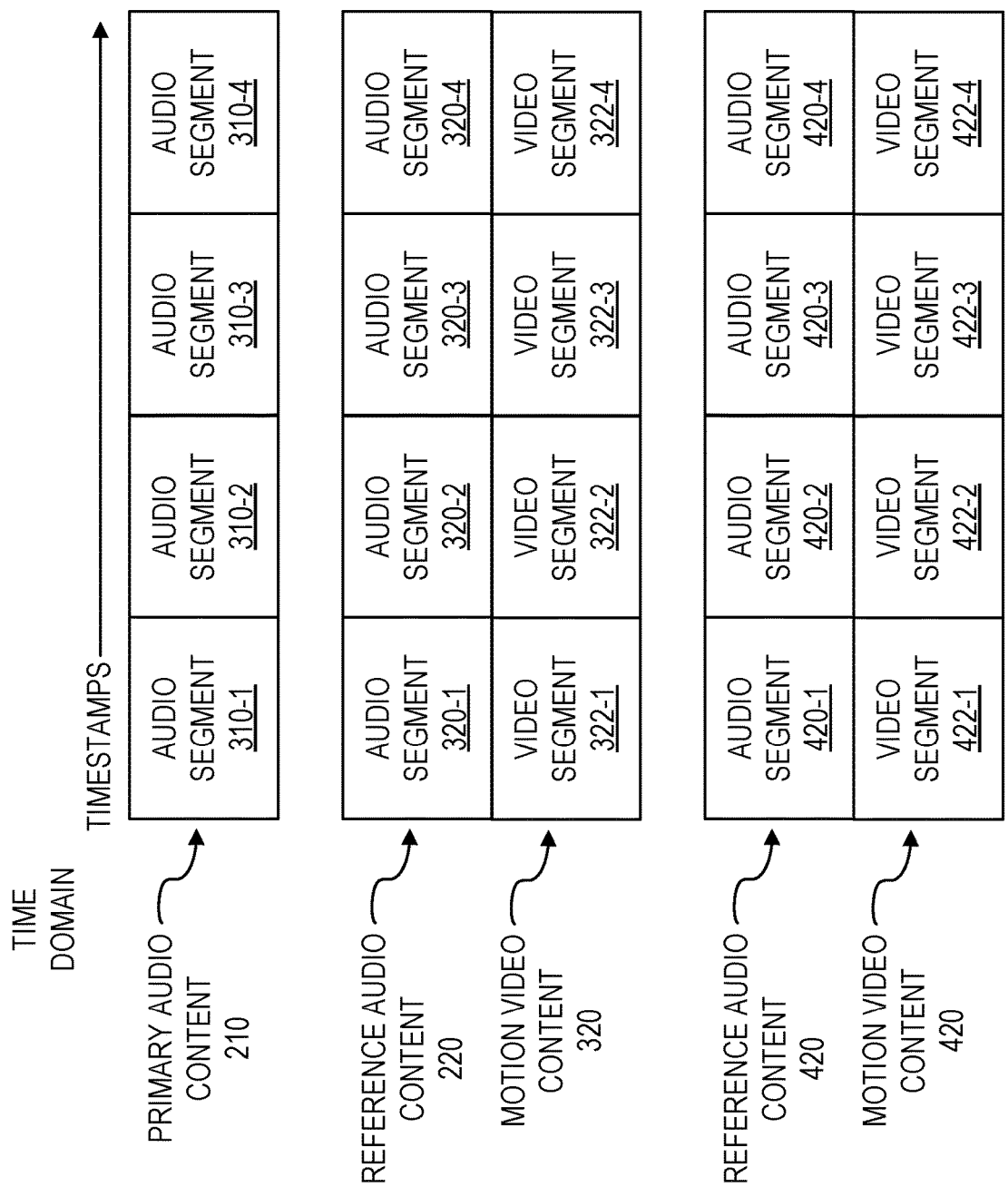
FIGS. 4A-4B are conceptual diagrams illustrating the synchronizing of different motion video contents with primary audio content, in accordance with some example embodiments.
Figure 4B:
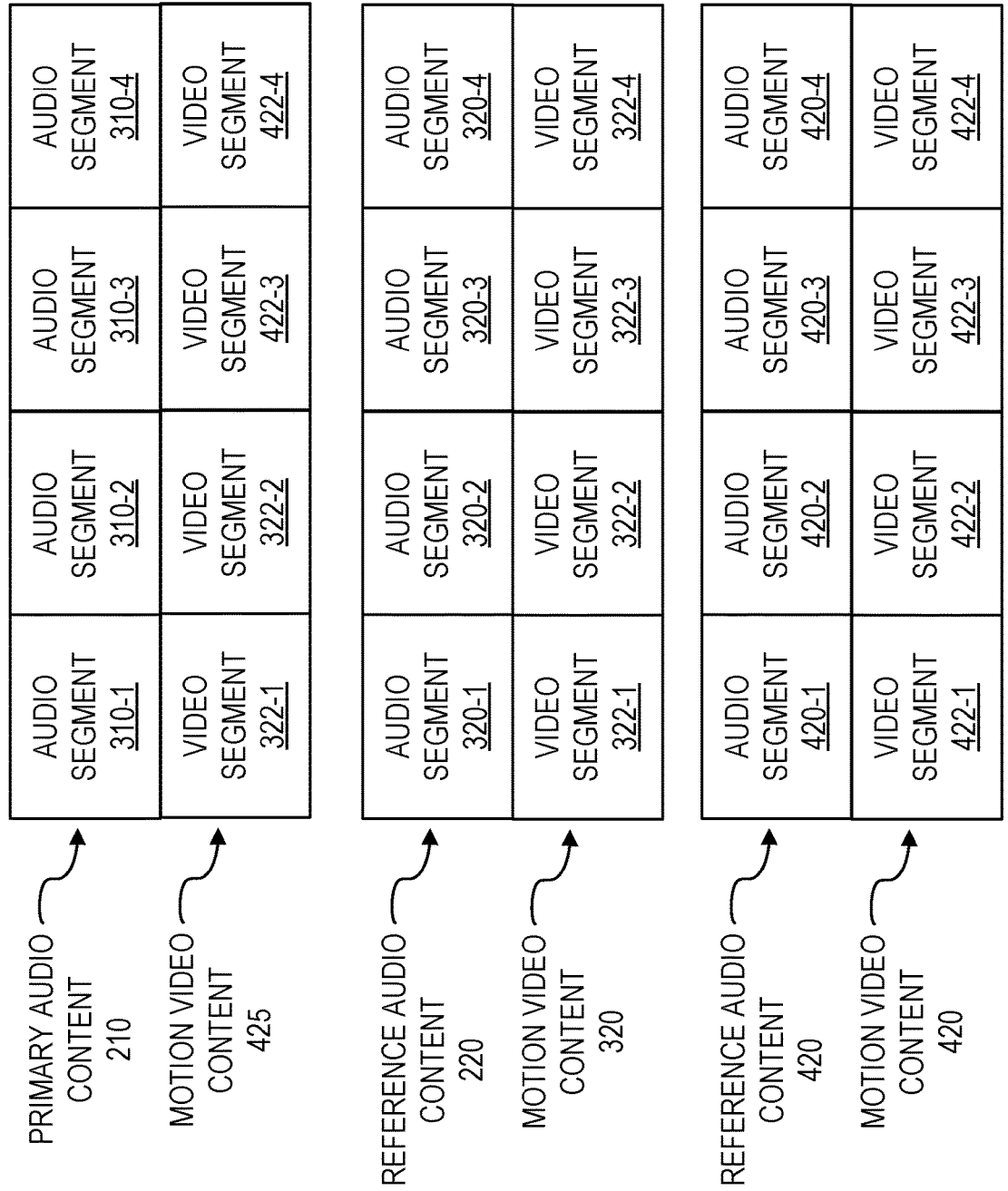

In some example embodiments, portions from a plurality of different motion video contents associated with a plurality of different reference audio contents are combined with the primary audio content. FIGS. 4A-4B are conceptual diagrams illustrating the synchronizing of different motion video contents with primary audio content, in accordance with some example embodiments. In FIG. 4A, similar to FIG. 3A, a primary audio content 210 is shown as being made up of audio segments 310-1, 310-2, 310-3, and 310-4, and reference audio content 220 is shown as being made up of audio segments 320-1, 320-2, 320-3, and 320-4. Reference audio content 220 is also shown as being stored in association with motion video content 320, which is shown as being made up of video segments 322-1, 322-2, 322-3, and 322-4. The audio segments 310 of the primary audio content 210 and the audio segments 320 of the reference audio content 220 are aligned along a time domain in accordance with their respective timestamps as a result of the presentation module 116 synchronizing them. Similarly, the video segments 322 of the motion video content 320 are aligned with the audio segments 320 of the reference audio content 220 with which it is associated.

Additionally, in FIG. 4A, another reference audio content 420 is shown as being made up of audio segments 420-1, 420-2, 420-3, and 420-4. Reference audio content 420 is also shown as being stored in association with motion video content 420, which is shown as being made up of video segments 422-1, 422-2, 422-3, and 422-4. The audio segments 420-1, 420-2, 420-3, and 420-4 of the reference audio content 420 and the video segments 422-1, 422-2, 422-3, and 422-4 are aligned with the audio segments 310-1, 310-2, 310-3, and 310-4 of the primary audio content 210.

Using the synchronizations, the presentation module 116 generates a motion video content 425 from portions of the motion video content 320 and portions of the motion video content 420. As a result, video segment 322-1 is synchronized with audio segment 310-1, video segment 322-2 is synchronized with audio segment 310-2, video segment 422-3 is synchronized with audio segment 310-3, and video segment 422-4 is synchronized with audio segment 310-4.

In some example embodiments, the presentation module 116 is configured to synchronize the audio segments 310 of the primary audio content 210 with the audio segments 320 of the reference audio content 220 based on an exact fingerprint match between the audio segments 310 of the primary audio content 210 and the audio segments 320 of the reference audio content 220. For example, the presentation module 116 may synchronize the audio segments 310 of the primary audio content 210 with the audio segments 320 of the reference audio content 220 based on a match between one version of an audio recording (e.g., compressed or noisy) and a version of the same audio recording that is not degraded.

In some example embodiments, the presentation module 116 is configured to synchronize the audio segments 310 of the primary audio content 210 with the audio segments 320 of the reference audio content 220 based on a fuzzy fingerprint match between the audio segments 310 of the primary audio content 210 and the audio segments 320 of the reference audio content 220. For example, the presentation module 116 may synchronize the audio segments 310 of the primary audio content 210 with the audio segments 320 of the reference audio content 220 based on a match between a recording of a song (or a theatrical performance, narration, or the like) and a different performance or recording of the same song (or theatrical performance, narration, or the like).

In some example embodiments, the presentation module 116 is configured to synchronize the audio segments 310 of the primary audio content 210 with the audio segments 320 of the reference audio content 220 using a match between audio characteristics, such as chords, rhythmic features, instrument onsets, and the like, of the audio segments 310 of the primary audio content 210 with such audio characteristics of the audio segments 320 of the reference audio content 220. For example, the presentation module 116 may synchronize the audio segments 310 of the primary audio content 210 with the audio segments 320 of the reference audio content 220 based on particular level of similarity between the audio characteristics of different audio recordings, such as synchronizing two different songs based on a determination of a high level of similarity between the rhythmic features of the two different songs.

In some example embodiments, the video identification module 114 and the presentation module 116 are configured to identify different motion video content to synchronize and display concurrently with the same primary audio content, thereby changing the video experience for the same primary audio content from one playback to the next. The change in the video experience from one presentation of the primary audio content to the next may be partial, such as by swapping out one video segment or one scene for another video segment or another scene, while maintaining at least one video segment or one scene from one presentation to the next. Alternatively, the change in the video experience from one presentation of the primary audio content to the next may be complete, such as by replacing all of the video segments used for a presentation of the primary audio content with completely different video segments for a subsequent presentation of the primary audio content. For example, on one day, video content covering an entire live performance of a song may be synchronized and displayed concurrently with primary audio content, and then on a subsequent day, video content covering an entire performance of the same song in a studio (e.g., different from the live performance) may be synchronized and displayed concurrently with the same primary audio content instead of the video content covering the entire live performance of the song. Such changing of the video experience may be based on detected changes in popularity of the video content (e.g., changes in the total number of YouTube views of video content from day to day), or may be based on detected changes in preferences or behavior of the user who is to be presented with the video content along with the primary audio content (e.g., changes in the user's viewing habits of video content on YouTube), or may be random. It is contemplated that other factors may be used to cause the changing of video content from one presentation to another.

Figure 5:
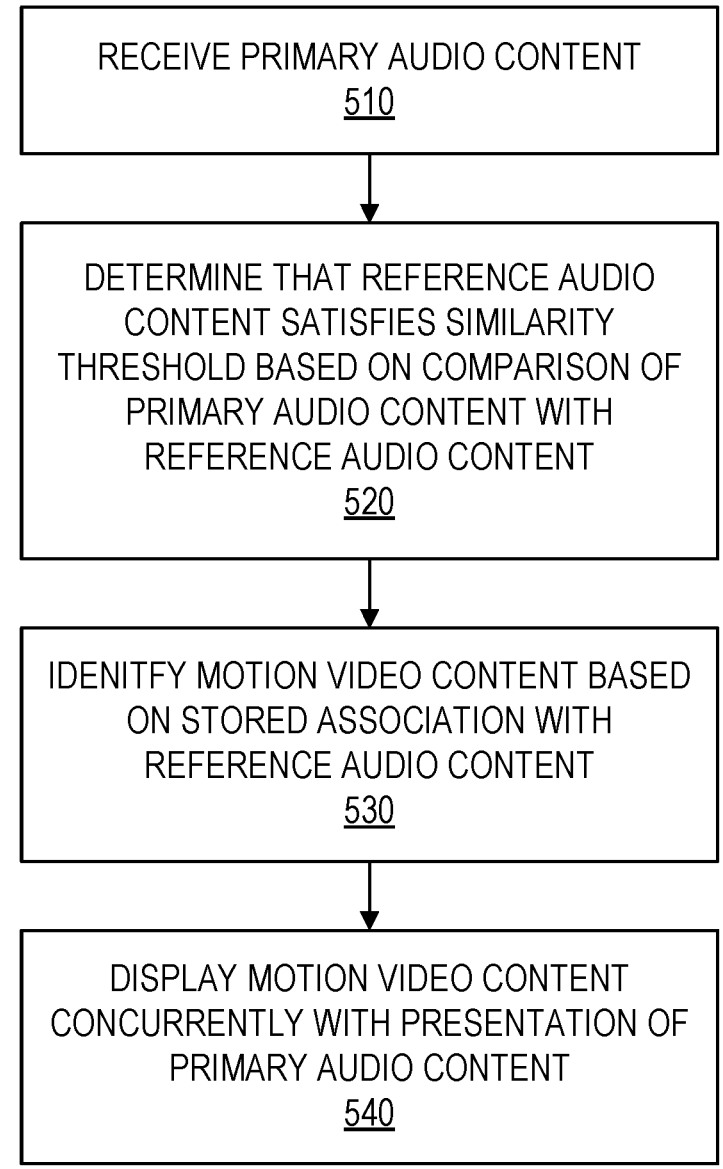
FIG. 5 is a flowchart illustrating a method of providing motion video content along with audio content, in accordance with some example embodiments.

FIG. 5 is a flowchart illustrating a method 500 of providing motion video content along with audio content, in accordance with some example embodiments. Method 500 can be performed by processing logic that can comprise hardware (e.g., circuitry, dedicated logic, programmable logic, microcode, etc.), software (e.g., instructions run on a processing device), or a combination thereof. In one example embodiment, the method 500 is performed by the content provider 110 of FIG. 1, or any combination of one or more of its components or modules.

At operation 510, the content provider 110 receives primary audio content. In some example embodiments, the primary audio content comprises music (e.g., a song). At operation 520, the content provider 110 determines that at least one reference audio content satisfies a predetermined similarity threshold based on a comparison of the primary audio content with the at least one reference audio content. In some example embodiments, the comparison comprises a comparison of fingerprint data of the primary audio content with fingerprint data of the at least one reference audio content. At operation 530, for each one of the at least one reference audio content, the content provider 110 identifies motion video content based on the motion video content being stored in association with the one of the at least one reference audio content and not stored in association with the primary audio content. In some example embodiments, the identifying of the motion video content is further based on a profile of a user associated with the device. At operation 540, the content provider 110 causes the identified motion video content to be displayed on a device concurrently with a presentation of the primary audio content on the device. It is contemplated that any of the other features described within the present disclosure can be incorporated into method 500.

Figure 6:
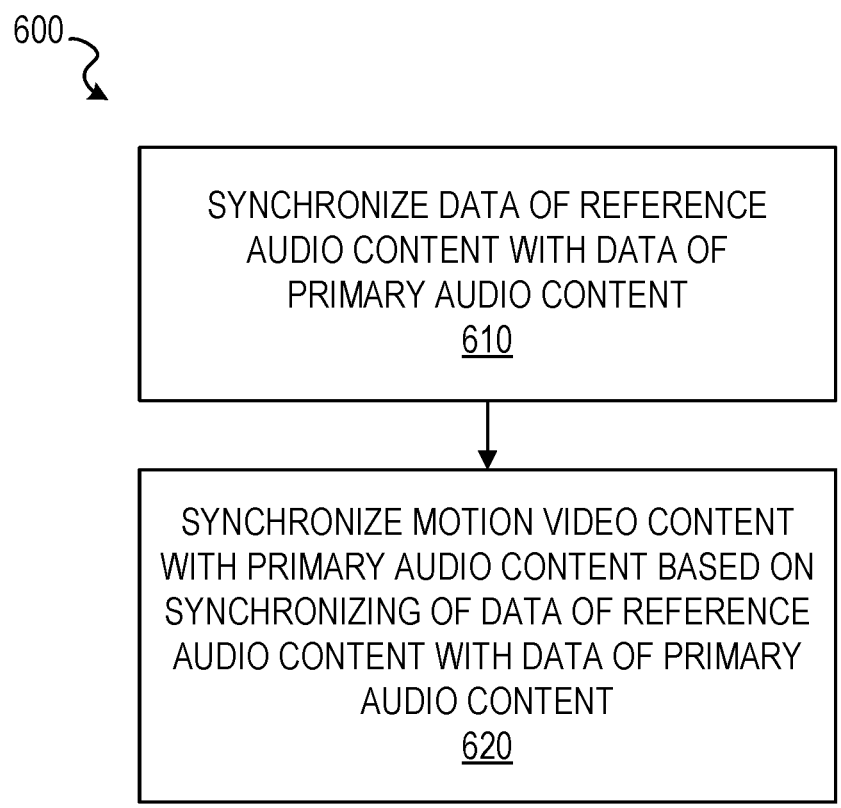
FIG. 6 is a flowchart illustrating a method of causing motion video content to be displayed on a device concurrently with the presentation of audio content on the device, in accordance with some example embodiments.

FIG. 6 is a flowchart illustrating a method 600 of causing motion video content to be displayed on a device concurrently with the presentation of audio content on the device, in accordance with some example embodiments. Method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by the content provider 110 of FIG. 1, or any combination of one or more of its components or modules.

At operation 610, the content provider synchronizes data of at least one reference audio content with data of primary audio content. At operation 620, the content provider 110 synchronizes identified motion video content with the primary audio content based on the synchronizing of the data of the at least one reference audio content with the data of the primary audio content. In some example embodiments, the synchronizing of the data of the at least one reference audio content with the data of the primary audio content is based on a comparison of fingerprint data of the at least one reference audio content with fingerprint data of the primary audio content. It is contemplated that any of the other features described within the present disclosure can be incorporated into method 600.

Example Mobile Device

Figure 7:
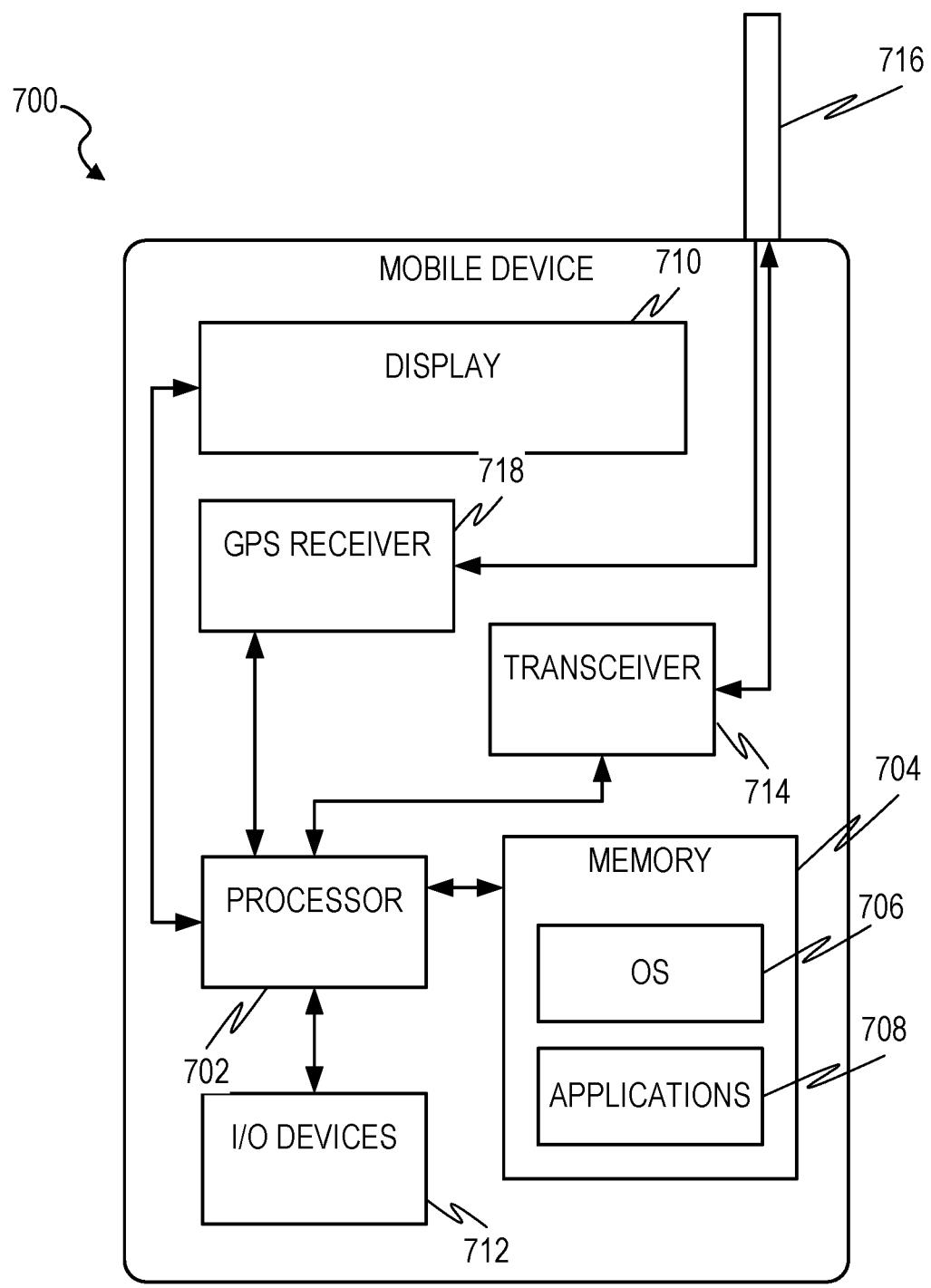
FIG. 7 is a block diagram illustrating a mobile device, in accordance with some example embodiments.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as application programs 708, such as a mobile location enabled application that can provide LBSs to a user. The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field-programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 8:
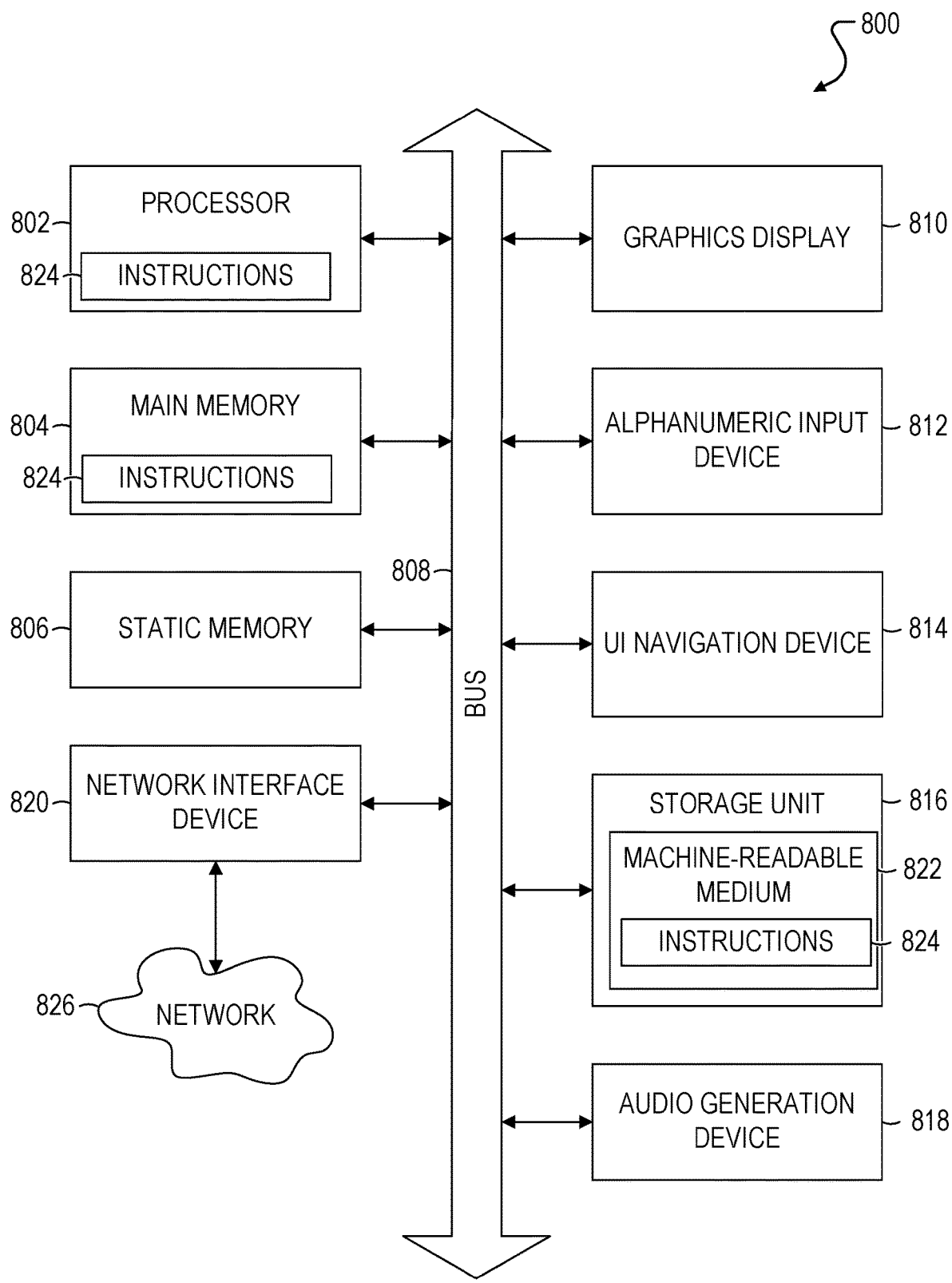
FIG. 8 is a block diagram of an example computer system on which methodologies described herein can be executed, in accordance with some example embodiments.

FIG. 8 is a block diagram of a machine in the example form of a computer system 800 within which instructions 824 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 can further include a video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a disk drive unit 816, a signal generation device 818 (e.g., a speaker) and a network interface device 820.

The disk drive unit 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media. The instructions 824 can also reside, completely or at least partially, within the static memory 806.

While the machine-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   determining, by at least one hardware processor, that reference audio content satisfies a predetermined similarity threshold based on a comparison of primary audio content with the reference audio content;
   identifying a first motion video content based on the first motion video content being stored in association with the reference audio content and not stored in association with the primary audio content;
   identifying a second motion video content based on the second motion video content being stored in association with the reference audio content and not stored in association with the primary audio content; and
   causing at least one of the identified first motion video content and the identified second motion video content to be displayed on a device concurrently with a presentation of the primary audio content on the device.

2. The computer-implemented method of claim 1, wherein the primary audio content comprises music.

3. The computer-implemented method of claim 1, wherein causing at least one of the identified first motion video content and the second motion video content to be displayed on the device concurrently with the presentation of the primary audio content on the device comprises:
   causing a portion of the identified first motion video content to be displayed on a device concurrently with a presentation of a first portion of the primary audio content on the device; and
   causing a portion of the identified second motion video content to be displayed on a device concurrently with a presentation of a second portion of the primary audio content on the device.

4. The computer-implemented method of claim 1, wherein causing at least one of the identified first motion video content and the second motion video content to be displayed on the device concurrently with the presentation of the primary audio content on the device comprises:
   detecting a change in popularity of the identified first motion video content; and
   based on the detected change in popularity of the identified first motion video content, causing the identified first motion video content to be displayed on a device concurrently with a presentation of the primary audio content on the device.

5. The computer-implemented method of claim 1, wherein causing at least one of the identified first motion video content and the second motion video content to be displayed on the device concurrently with the presentation of the primary audio content on the device comprises:
   detecting a change in a preference of a user associated with the device; and
   based on the detected change in preference of the user associated with the device, causing the identified first motion video content to be displayed on a device concurrently with a presentation of the primary audio content on the device.

6. The computer-implemented method of claim 1, wherein causing at least one of the identified first motion video content and the second motion video content to be displayed on the device concurrently with the presentation of the primary audio content on the device comprises:
   detecting a change in a behavior of a user associated with the device; and
   based on the detected change in preference of the user associated with the device, causing the identified first motion video content to be displayed on a device concurrently with a presentation of the primary audio content on the device.

7. The computer-implemented method of claim 1, wherein causing at least one of the identified first motion video content and the second motion video content to be displayed on the device concurrently with the presentation of the primary audio content on the device comprises:
   synchronizing data of the reference audio content with data of the primary audio content; and
   synchronizing at least one of the at least one of the identified first motion video content and the identified second motion video content with the primary audio content based on the synchronizing of the data of the reference audio content with the data of the primary audio content.

8. A system comprising:
   at least one processor; and
   a non-transitory computer-readable medium storing executable instructions that, when executed, cause the at least one processor to perform operations comprising:
   determining that reference audio content satisfies a predetermined similarity threshold based on a comparison of primary audio content with the reference audio content;
   identifying a first motion video content based on the first motion video content being stored in association with the reference audio content and not stored in association with the primary audio content;
   identifying a second motion video content based on the second motion video content being stored in association with the reference audio content and not stored in association with the primary audio content; and
   causing at least one of the identified first motion video content and the identified second motion video content to be displayed on a device concurrently with a presentation of the primary audio content on the device.

9. The system of claim 8, wherein the primary audio content comprises music.

10. The system of claim 8, wherein causing at least one of the identified first motion video content and the second motion video content to be displayed on the device concurrently with the presentation of the primary audio content on the device comprises:
    causing a portion of the identified first motion video content to be displayed on a device concurrently with a presentation of a first portion of the primary audio content on the device; and
    causing a portion of the identified second motion video content to be displayed on a device concurrently with a presentation of a second portion of the primary audio content on the device.

11. The system of claim 8, wherein causing at least one of the identified first motion video content and the second motion video content to be displayed on the device concurrently with the presentation of the primary audio content on the device comprises:
    detecting a change in popularity of the identified first motion video content; and
    based on the detected change in popularity of the identified first motion video content, causing the identified first motion video content to be displayed on a device concurrently with a presentation of the primary audio content on the device.

12. The system of claim 8, wherein causing at least one of the identified first motion video content and the second motion video content to be displayed on the device concurrently with the presentation of the primary audio content on the device comprises:
   detecting a change in a preference of a user associated with the device; and
   based on the detected change in preference of the user associated with the device, causing the identified first motion video content to be displayed on a device concurrently with a presentation of the primary audio content on the device.

13. The system of claim 12, wherein causing at least one of the identified first motion video content and the second motion video content to be displayed on the device concurrently with the presentation of the primary audio content on the device comprises:
   detecting a change in a behavior of a user associated with the device; and
   based on the detected change in preference of the user associated with the device, causing the identified first motion video content to be displayed on a device concurrently with a presentation of the primary audio content on the device.

14. The system of claim 8, wherein causing at least one of the identified first motion video content and the second motion video content to be displayed on the device concurrently with the presentation of the primary audio content on the device comprises:
   synchronizing data of the reference audio content with data of the primary audio content; and
   synchronizing at least one of the at least one of the identified first motion video content and the identified second motion video content with the primary audio content based on the synchronizing of the data of the reference audio content with the data of the primary audio content.

15. A non-transitory machine-readable storage medium, tangibly embodying a set of instructions that, when executed by at least one processor, causes the at least one processor to perform operations comprising:
   determining, by at least one hardware processor, that reference audio content satisfies a predetermined similarity threshold based on a comparison of primary audio content with the reference audio content;
   identifying a first motion video content based on the first motion video content being stored in association with the reference audio content and not stored in association with the primary audio content;
   identifying a second motion video content based on the second motion video content being stored in association with the reference audio content and not stored in association with the primary audio content; and
   causing at least one of the identified first motion video content and the identified second motion video content to be displayed on a device concurrently with a presentation of the primary audio content on the device.

16. The non-transitory machine-readable storage medium of claim 15, wherein causing at least one of the identified first motion video content and the second motion video content to be displayed on the device concurrently with the presentation of the primary audio content on the device comprises:
   causing a portion of the identified first motion video content to be displayed on a device concurrently with a presentation of a first portion of the primary audio content on the device; and
   causing a portion of the identified second motion video content to be displayed on a device concurrently with a presentation of a second portion of the primary audio content on the device.

17. The non-transitory machine-readable storage medium of claim 15, wherein causing at least one of the identified first motion video content and the second motion video content to be displayed on the device concurrently with the presentation of the primary audio content on the device comprises:
   detecting a change in popularity of the identified first motion video content; and
   based on the detected change in popularity of the identified first motion video content, causing the identified first motion video content to be displayed on a device concurrently with a presentation of the primary audio content on the device.

18. The non-transitory machine-readable storage medium of claim 15, wherein causing at least one of the identified first motion video content and the second motion video content to be displayed on the device concurrently with the presentation of the primary audio content on the device comprises:
   detecting a change in a preference of a user associated with the device; and
   based on the detected change in preference of the user associated with the device, causing the identified first motion video content to be displayed on a device concurrently with a presentation of the primary audio content on the device.

19. The non-transitory machine-readable storage medium of claim 18, wherein causing at least one of the identified first motion video content and the second motion video content to be displayed on the device concurrently with the presentation of the primary audio content on the device comprises:
   detecting a change in a behavior of a user associated with the device; and
   based on the detected change in preference of the user associated with the device, causing the identified first motion video content to be displayed on a device concurrently with a presentation of the primary audio content on the device.

20. The non-transitory machine-readable storage medium of claim 15, wherein causing at least one of the identified first motion video content and the second motion video content to be displayed on the device concurrently with the presentation of the primary audio content on the device comprises:
   synchronizing data of the reference audio content with data of the primary audio content; and
   synchronizing at least one of the at least one of the identified first motion video content and the identified second motion video content with the primary audio content based on the synchronizing of the data of the reference audio content with the data of the primary audio content.

* * * * *